(12) United States Patent
Kakinuma (10) Patent No.: US 11,865,634 B2
(45) Date of Patent: Jan. 9, 2024

(54) PROCESSING METHOD OF WORKPIECE

(71) Applicant: DISCO CORPORATION, Tokyo (JP)

(72) Inventor: Yoshinori Kakinuma, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/811,971

(22) Filed: Jul. 12, 2022

(65) Prior Publication Data
US 2023/0031772 A1 Feb. 2, 2023

(30) Foreign Application Priority Data
Jul. 28, 2021 (JP) .................. 2021-123715

(51) Int. Cl.
*B23K 20/00* (2006.01)
*B23K 20/02* (2006.01)
*B23K 101/40* (2006.01)

(52) U.S. Cl.
CPC ........ *B23K 20/023* (2013.01); *B23K 2101/40* (2018.08)

(58) Field of Classification Search
CPC .... B23K 26/364; B23K 26/40; B23K 20/025; H01L 2224/85203
See application file for complete search history.

(56) References Cited

U.S. PATENT DOCUMENTS

| | | | | |
|---|---|---|---|---|
| 3,670,396 A * | 6/1972 | Lindberg | ................ | H01L 24/81 257/E21.511 |
| 2008/0186751 A1 * | 8/2008 | Tokuyama | ............. | H05K 7/209 363/141 |
| 2009/0291259 A1 * | 11/2009 | Bito | .......................... | B32B 7/12 428/458 |
| 2009/0305046 A1 * | 12/2009 | Bito | ....................... | H05K 3/386 428/458 |
| 2012/0006489 A1 * | 1/2012 | Okita | ................. | H01L 21/67757 156/345.43 |
| 2019/0378745 A1 * | 12/2019 | Harada | ....................... | C09J 5/06 |
| 2019/0378746 A1 * | 12/2019 | Kiuchi | ................ | H01L 21/6836 |
| 2019/0378758 A1 * | 12/2019 | Harada | ..................... | C09J 7/241 |

(Continued)

FOREIGN PATENT DOCUMENTS

JP 2019212812 A 12/2019

OTHER PUBLICATIONS

JP2019-212812 english translation (Year: 2023).*

*Primary Examiner* — Erin B Saad
(74) *Attorney, Agent, or Firm* — GREER BURNS & CRAIN, LTD.

(57) ABSTRACT

A processing method of a workpiece includes an integration step of heating and compression bonding a thermocompression bonding sheet to an annular frame that has an opening to receive the workpiece therein and to the workpiece received in the opening, whereby the annular frame and the workpiece are integrated via the thermocompression bonding sheet, and a processing step of processing the workpiece integrated with the annular frame via the thermocompression bonding sheet. In the integration step, the thermocompression bonding sheet is pressed against the annular frame that has been heated by a heat table with a heat source included therein, by a heat roller with a heat source included therein while being heated by the heat roller, whereby the thermocompression bonding sheet is fixed to the annular frame.

9 Claims, 6 Drawing Sheets

(56) References Cited

U.S. PATENT DOCUMENTS

| | | | |
|---|---|---|---|
| 2019/0385887 A1* | 12/2019 | Kiuchi | H01L 21/67092 |
| 2019/0393089 A1* | 12/2019 | Zhao | C09J 7/241 |
| 2020/0013675 A1* | 1/2020 | Harada | H01L 21/6836 |
| 2020/0013676 A1* | 1/2020 | Harada | H01L 21/67132 |
| 2020/0035559 A1* | 1/2020 | Harada | H01L 21/67132 |
| 2020/0043772 A1* | 2/2020 | Harada | H01L 21/6836 |
| 2020/0043789 A1* | 2/2020 | Harada | H01L 21/78 |
| 2020/0058537 A1* | 2/2020 | Sekiya | H01L 21/67092 |
| 2020/0075824 A1* | 3/2020 | Takojima | H01L 33/62 |
| 2020/0185253 A1* | 6/2020 | Harada | C09J 5/06 |
| 2020/0235010 A1* | 7/2020 | Harada | H01L 21/68778 |

* cited by examiner

PROCESSING METHOD OF WORKPIECE

BACKGROUND OF THE INVENTION

Field of the Invention

The present invention relates to a processing method of a workpiece.

Description of the Related Art

When grinding a variety of plate-shaped workpieces such as wafers with semiconductor devices formed thereon to thin them or to divide them into individual device chips, it is a common practice to bond an adhesive tape to a front surface of each workpiece for protecting the front surface during the processing and also for preventing its device chips from coming apart after the division.

If a workpiece includes on a front surface thereof irregularities due to the formation of electrode bumps or the like for semiconductor devices, however, an adhesive tape, which includes a bonding layer of a thickness equal to or greater than the irregularities and can absorb the irregularities, is required so that the irregularities do not affect the results of processing such as grinding. Such an adhesive tape may, however, cause failures in operation of the devices because residues of its bonding layer remain around the irregularities.

Accordingly, a method has been contrived to absorb irregularities and to leave no residues by using a resin sheet, which is made from a thermoplastic resin and includes no bonding layer, instead of an adhesive tape and thermocompression bonding it (see, for example, JP 2019-212812A).

SUMMARY OF THE INVENTION

With the resin sheet disclosed in JP 2019-212812A, however, a new problem has arisen that it is hardly fixed especially to an annular frame with a workpiece supported thereon due to the absence of a bonding layer.

The present invention therefore has as an object thereof the provision of a processing method of a workpiece, which can firmly fix a thermocompression bonding sheet to the workpiece and an annular frame.

In accordance with an aspect of the present invention, there is provided a processing method of a workpiece. The processing method includes an integration step of heating and compression bonding a thermocompression bonding sheet to an annular frame that has an opening to receive the workpiece therein and to the workpiece received in the opening, thereby the annular frame and the workpiece are integrated via the thermocompression bonding sheet, and a processing step of processing the workpiece integrated with the annular frame via the thermocompression bonding sheet. In the integration step, the thermocompression bonding sheet is pressed against the annular frame that has been heated by a heat table with a heat source included therein, by a heat roller with a heat source included therein while being heated by the heat roller, thereby the annular frame is fixed to the thermocompression bonding sheet.

Preferably, in the integration step, the workpiece and the annular frame may be both fixed to one surface of the thermocompression bonding sheet.

Preferably, in the integration step, the workpiece and the annular frame may be fixed to one surface and another surface, respectively, of the thermocompression bonding sheet.

Preferably, the integration step may include a workpiece fixing step of fixing the workpiece to the one surface of the thermocompression bonding sheet, and a frame fixing step of fixing the annular frame to the other surface of the thermocompression bonding sheet.

Preferably, the thermocompression bonding sheet may have no bonding layer in regions where the workpiece and the annular frame are compression bonded.

According to the present invention, the thermocompression bonding sheet can be firmly fixed to the workpiece and the annular frame.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

With reference to the attached drawings, a description will be made in detail about embodiments of the present invention. However, the present invention shall not be limited by details that will be described in the subsequent embodiments. The elements of configurations that will hereinafter be described include those readily conceivable to persons skilled in the art and substantially the same ones. Further, the configurations that will hereinafter be described can be combined appropriately. Furthermore, various omissions, replacements, and modifications of configurations can be made without departing from the spirit of the present invention.

First Embodiment

Figure 1:
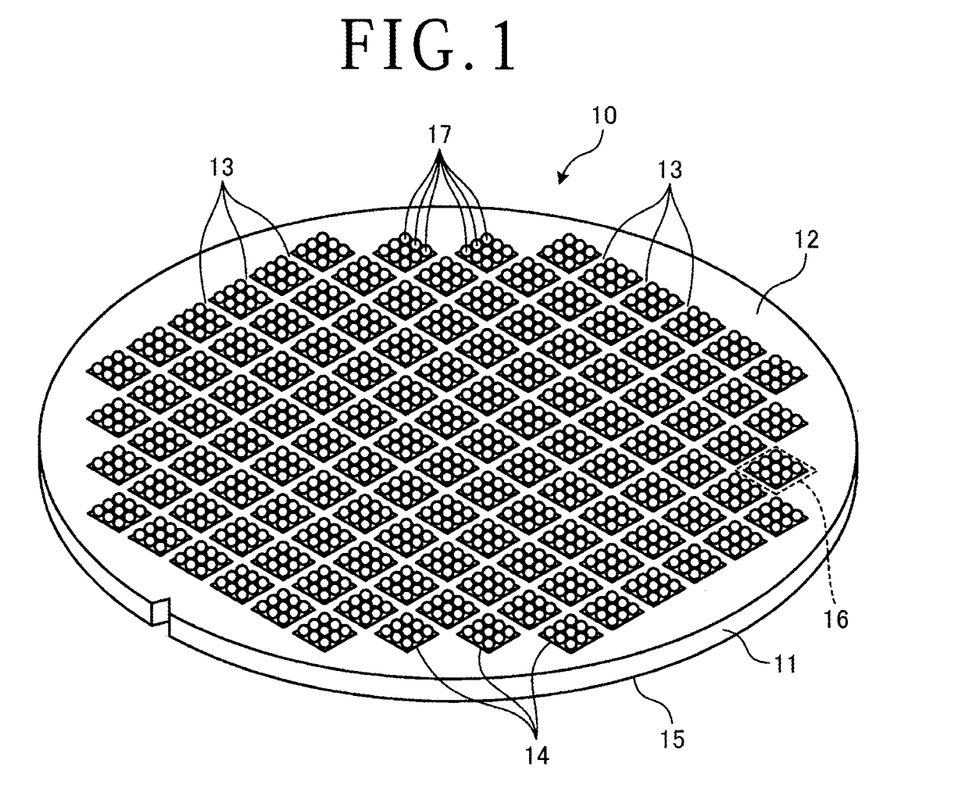
FIG. 1 is a perspective view depicting an example of a workpiece to be processed by a processing method according to a first embodiment of the present invention.

A first embodiment of the present invention will be described based on FIGS. 1 through 5. FIG. 1 is a perspective view depicting an example of a workpiece 10 to be processed by a processing method according to the first embodiment. The workpiece 10 is a wafer such as a disc-shaped semiconductor wafer or optical device wafer using silicon (Si), sapphire ($Al_2O_3$), gallium arsenide (GaAs), silicon carbide (SiC), or the like as a substrate 11.

The workpiece 10 has a plurality of scribe lines (hereinafter referred to as "streets") 13 set in a grid pattern on a front surface 12 of the substrate 11, and devices 14 formed in respective regions defined by the streets 13. The devices 14 are, for example, integrated circuits such as general integrated circuits (ICs) or large scale integration (LSI), image sensors such as charge coupled devices (CCDs) or complementary metal oxide semiconductors (CMOS), micro electro mechanical systems (MEMS), or the like.

The workpiece 10 is ground at a back surface 15 thereof to a finish thickness, for example, by a grinding machine. The back surface 15 is located on a side opposite to the front surface 12 on which the devices 14 are formed. After the thinning, the workpiece 10 is divided along the streets 13, for example, by cutting or the like, so that the workpiece 10 is singulated into individual device chips 16. It is to be noted that the device chips 16 are square in FIG. 1 but may be rectangular.

In the first embodiment, the workpiece 10 has irregularities due to the formation of a plurality of bumps 17, as protuberances protruding from front surfaces of the respective devices 14, on a side of the front surface 12. The bumps 17 are electrically connected to the respective devices 14 and in the form of the device chips 16 formed after the division of the workpiece 10, function as electrodes when inputting and outputting electrical signals to and from the corresponding devices 14. The bumps 17 are formed with a metal material such as, for example, gold, silver, copper, or aluminum.

Without being limited to the above description of the first embodiment, the workpiece 10 may be, for example, a package substrate. A package substrate includes on a front surface thereof bumps formed as electrodes for individual devices arranged side by side in a plane, and the devices are sealed with a sealing resin. The package substrate is thinned by grinding the sealing resin on a side of a back surface thereof, and is divided into individual devices, whereby the package substrate is singulated into individual device chips 16 sealed with the sealing resin and having a predetermined thickness.

In the first embodiment, the workpiece 10 includes irregularities formed on the front surface 12 due to the formation of the bumps 17. In the present invention, however, irregularities may be formed on the side of the front surface 12 by other structure elements of materials or the like, which make up the devices 14, without being necessarily limited to the formation of the bumps 17, or even no irregularities may be formed.

Figure 2:
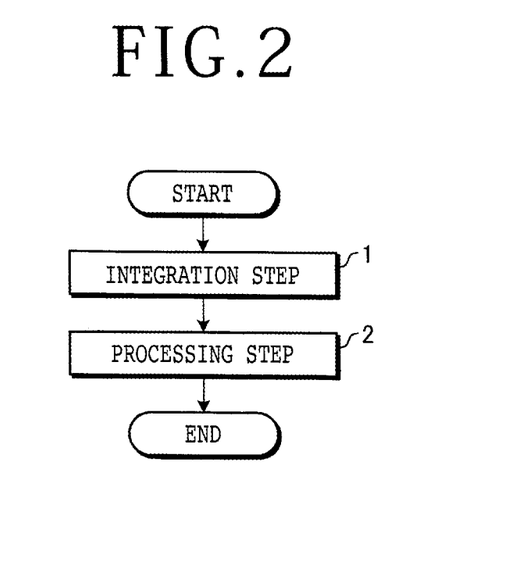
FIG. 2 is a flow chart diagram depicting a flow of the processing method according to the first embodiment for the workpiece.

FIG. 2 is a flow chart diagram depicting a flow of the processing method according to the first embodiment for the workpiece 10. The processing method of the workpiece 10 includes an integration step 1 and a processing step 2.

Figure 3:
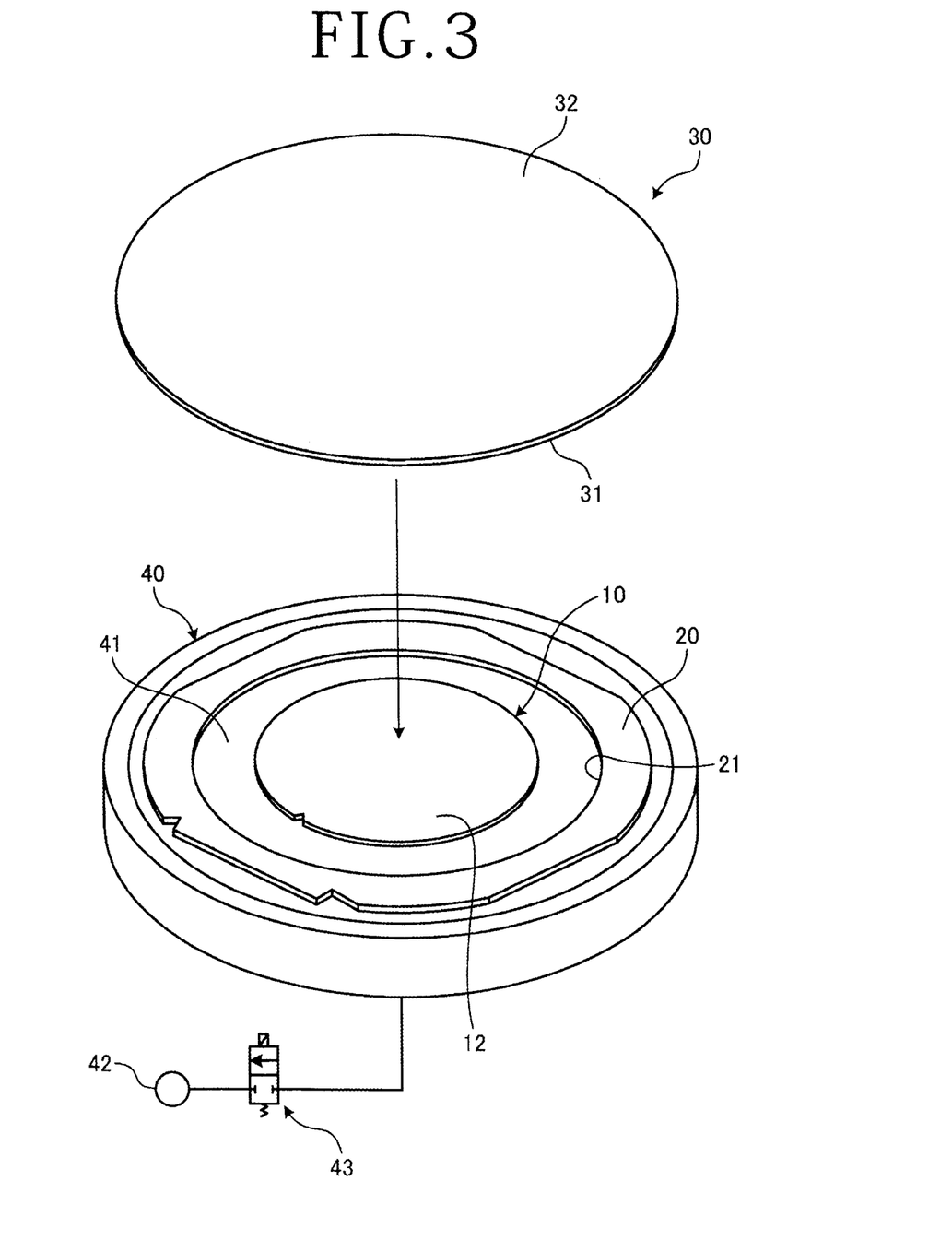
FIG. 3 is a perspective view schematically depicting how the workpiece and an annular frame are positioned on a heat table before an integration step depicted in FIG. 2.
Figure 4:
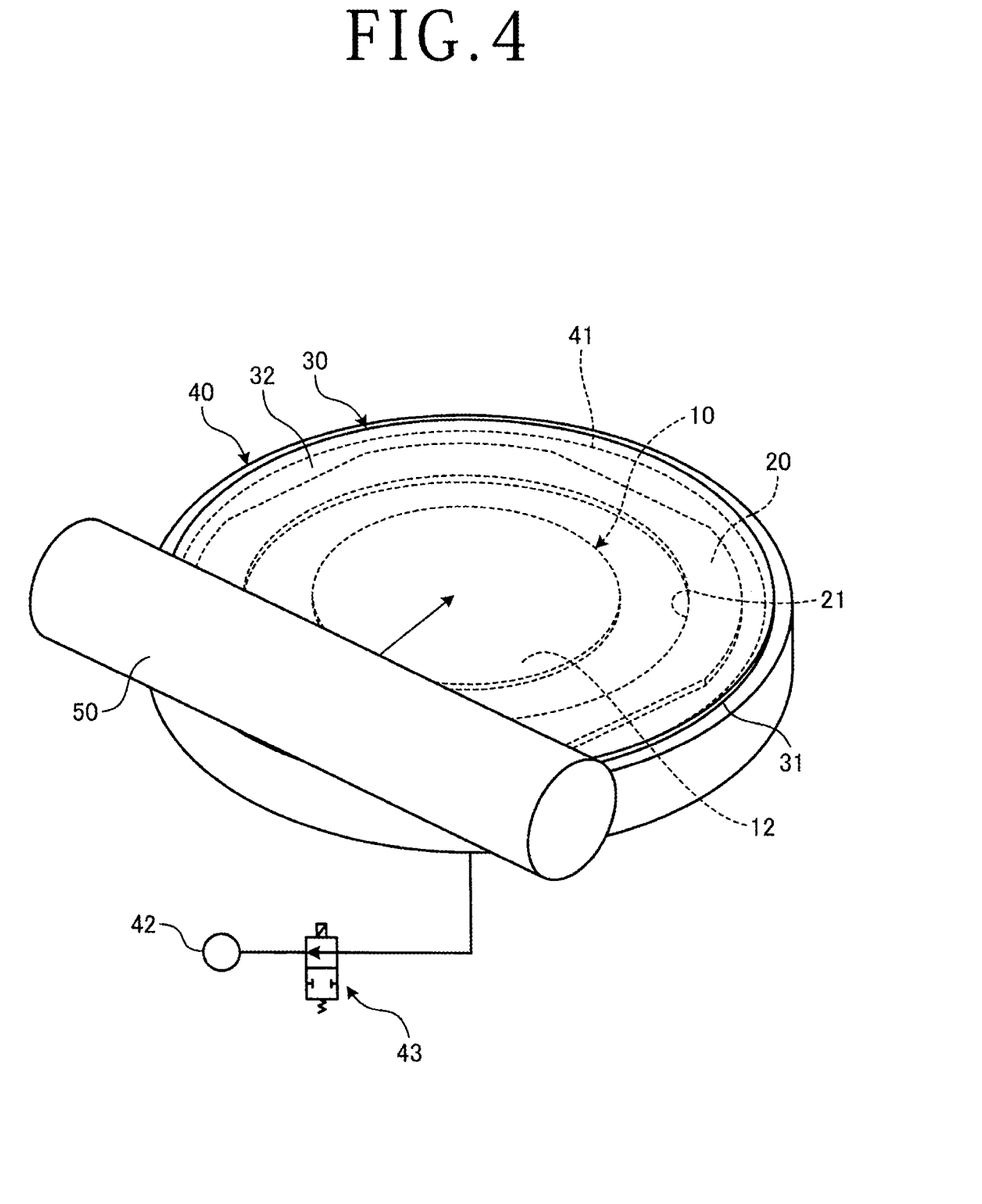
FIG. 4 is a perspective view schematically depicting an example of the integration step depicted in FIG. 2.

FIG. 3 is a perspective view schematically depicting how the workpiece 10 and an annular frame 20 are positioned on a heat table 40 before the integration step 1 depicted in FIG. 2. FIG. 4 is a perspective view schematically depicting an example of the integration step 1 depicted in FIG. 2. In the integration step 1, a thermocompression bonding sheet 30 is heated and compression bonded to the annular frame 20 and the workpiece 10, whereby the annular frame 20 and the workpiece 10 are integrated via the thermocompression bonding sheet 30. In the first embodiment, the integration step 1 is performed by the heat table 40 and a heat roller 50, each of which internally includes a heat source.

As depicted in FIG. 3, the annular frame 20 is formed in an annular shape in plan view with an opening 21 greater than an outer diameter of the workpiece 10. The annular frame 20 can receive the workpiece 10 inside the opening 21. The annular frame 20 is made from a material such as metal or resin.

The thermocompression bonding sheet 30 is made from a thermoplastic resin that can be formed into a sheet shape. The thermocompression bonding sheet 30 has a plan shape greater than the opening 21 of the annular frame 20. In the first embodiment, the thermocompression bonding sheet 30 has a disc-shaped, planar first surface 31 and second surface 32 having an outer periphery greater than that of the annular frame 20. The thermocompression bonding sheet 30 has flexibility, non-adhesiveness, and thermoplasticity, and includes no bonding layer having adhesiveness. In the first embodiment, the thermocompression bonding sheet 30 is made from a resin transparent or translucent to visible light. In the first embodiment, the thermocompression bonding sheet 30 is more specifically a sheet of a polymer synthesized using an alkene as a monomer, and is made using, for example, polyethylene, polypropylene, polystyrene, or the like as a thermoplastic resin.

The heat table 40 internally includes the heat source, has at an upper center thereof a holding surface 41 of a diameter greater than the outer diameter of the annular frame 20, and heats the workpiece 10 and the annular frame 20 supported on the holding surface 41. The holding surface 41 has suction perforations (not depicted) in a region where the workpiece 10 and the annular frame 20 are to be placed. The suction perforations are connected to one end of a vacuum channel inside the heat table 40, and are in communication with a suction source 42, which is arranged at the other end of the vacuum channel, via the vacuum channel. In the vacuum channel, a switching valve 43 is arranged to perform switching between a communicated state and a cut-off state. When the switching valve 43 is in the communicated state, a negative pressure produced by the suction source 42 acts on the workpiece 10 and the annular frame 20 supported on the holding surface 41, so that the workpiece 10 and the annular frame 20 are held under suction on the heat table 40.

The heat roller 50 internally includes the heat source. The heat roller 50 is cylindrical, has an axial center extending in a horizontal direction, can roll from an end toward an opposite end of the holding surface 41 of the heat table 40 while rotating about the axial center thereof, and can press the thermocompression bonding sheet 30 against the workpiece 10 and the annular frame 20, which are supported on the heat table 40, in such directions that the thermocompression bonding sheet 30 is pushed and spread out over the holding surface 41. The heat roller 50 may be coated at a surface thereof with a fluorinated resin.

First, in the integration step 1 in the first embodiment, the heat source of the heat table 40 is activated to heat the holding surface 41 to a predetermined temperature, and at the same time, the heat source of the heat roller 50 depicted in FIG. 4 is activated to heat its surface to a predetermined temperature. Next, as depicted in FIG. 3, the workpiece 10 and the annular frame 20 are positioned on the holding surface 41 of the heat table 40. Here, with the workpiece 10 directed upward on the side of the front surface 12 thereof, the workpiece 10 is received and positioned in the opening 21 of the annular frame 20. As a consequence, the workpiece 10 is heated from the side of the back surface 15, and the annular frame 20 is heated from a side of a lower surface thereof, both, via the holding surface 41.

Next, the thermocompression bonding sheet 30 is placed onto the workpiece 10 and the annular frame 20 from the side of the front surface 12 of the workpiece 10. Here, the first surface 31 of the thermocompression bonding sheet 30 is ensured to cover the entirety of the holding surface 41 so that, when the negative pressure is caused to act from the suction source 42, the negative pressure is prevented from leaking out through a gap. The switching valve 43 of the heat table 40 is then operated to bring the suction source 42 and the holding surface 41 into communication with each other, so that the negative pressure is caused to act on the workpiece 10 and the annular frame 20 placed on the holding surface 41. As a consequence, the annular frame 20 is maintained on the side of the lower surface thereof in close contact with the holding surface 41 of the heat table 40 (see FIG. 4).

As depicted in FIG. 4, the heat roller 50 the surface of which has been heated to the predetermined temperature is next placed on one end of the holding surface 41 of the heat table 40. The heat roller 50 is then caused to roll on the second surface 32 of the thermocompression bonding sheet 30 from the one end to the other end of the holding surface 41 of the heat table 40 in a direction indicated by an arrow in FIG. 4. Here, the heat roller 50 presses the thermocompression bonding sheet 30 in such directions that the thermocompression bonding sheet 30 is pushed and spread out, thereby performing the thermocompression bonding of the thermocompression bonding sheet 30 to the workpiece 10 and the annular frame 20.

As described above, in the integration step 1 in the first embodiment, the thermocompression bonding sheet 30 is heated by the heat table 40 from the sides of the back surface 15 of the workpiece 10 and the lower surface of the annular frame 20, and is also heated by the heat roller 50 from a side of the second surface 32 of the thermocompression bonding sheet 30. In other words, the thermocompression bonding is performed by pressing the thermocompression bonding sheet 30 with the heat roller 50 while heating the thermocompression bonding sheet 30 from both of the surfaces thereof. As a consequence, the side of the first surface 31 of the thermocompression bonding sheet 30 and the sides of the front surface 12 of the workpiece 10 and an upper surface of the annular frame 20 are compression bonded, whereby the workpiece 10 and the annular frame 20 are integrated via the thermocompression bonding sheet 30. It is to be noted that the thermocompression bonding sheet 30 may preferably be heated to equal to or higher than its softening point and equal to or lower than its melting point when the thermocompression bonding sheet 30 is thermocompression bonded by the heat roller 50.

After the thermocompression bonding sheet 30 has been thermocompression bonded, a portion of the thermocompression bonding sheet 30, the portion being on an outer side of an outer periphery of the annular frame 20, is cut off and removed by a cutter or the like. The switching valve 43 is then operated to bring the suction source 42 and the holding surface 41 into a cut-off state, whereby the suction holding of the workpiece 10 and the annular frame 20 on the holding surface 41 of the heat table 40 is released. It is to be noted that, in a production line which processes a plurality of workpieces 10 one after another, the thermocompression bonding of the thermocompression bonding sheets 30 to the workpieces 10 and annular frames 20 is successively performed without deactivating the heat sources of the heat table 40 and heat roller 50. It is also to be noted that the thermocompression bonding sheet 30 is cooled in the production line as the workpieces 10 and the annular frames 20 are sequentially unloaded from the heat table 40.

Figure 5:
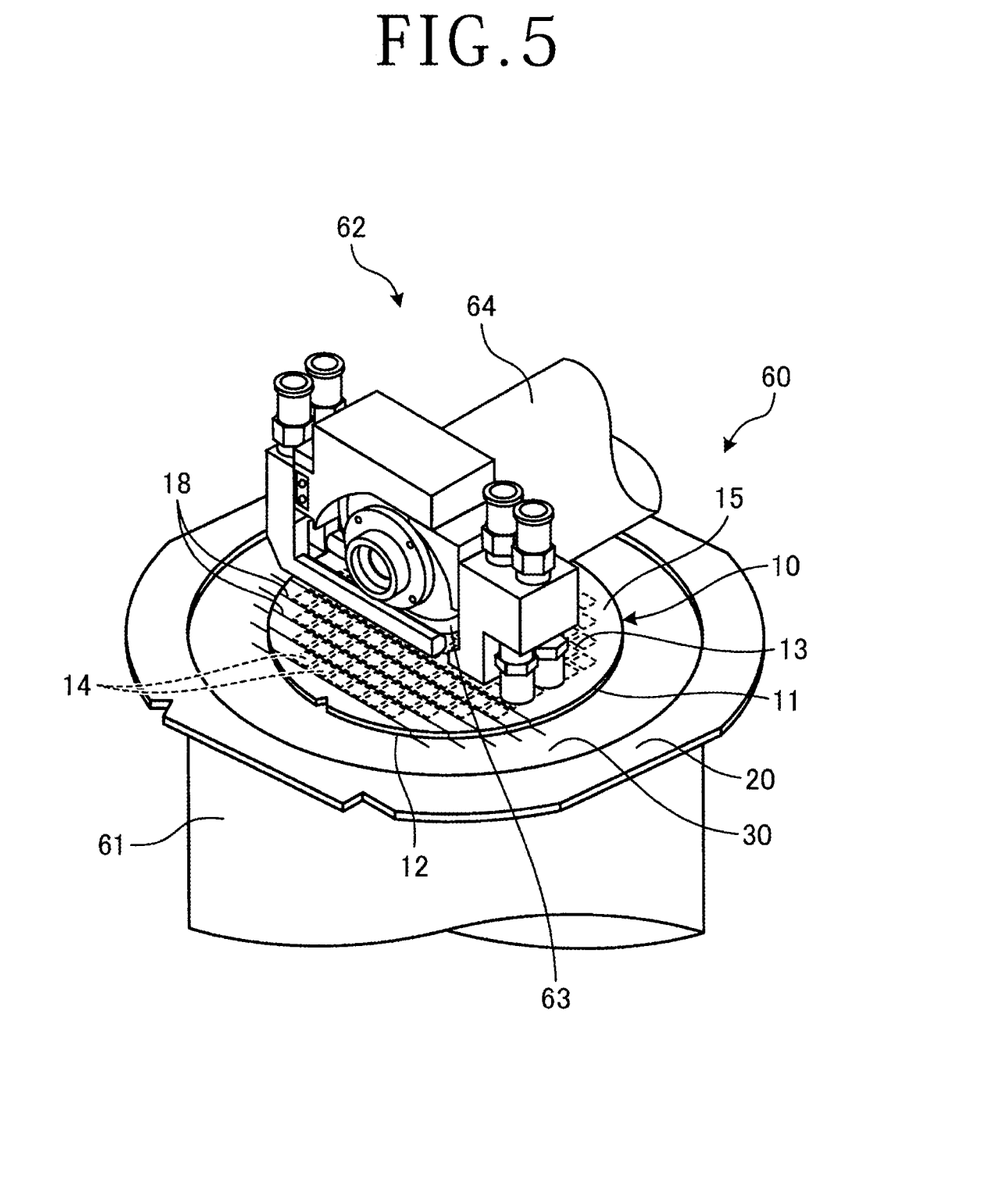
FIG. 5 is a perspective view depicting cutting processing as an example of a processing step depicted in FIG. 2.

FIG. 5 is a perspective view depicting cutting processing as an example of the processing step 2 depicted in FIG. 2. The processing step 2 processes the workpiece 10 integrated with the annular frame 20 via the thermocompression bonding sheet 30. In the processing step 2 in the first embodiment, the workpiece 10 is subjected to cutting processing by a cutting machine 60. In the present invention, however, grinding processing by a grinding machine, laser processing by a laser processing machine, or the like may also be performed, for example.

The cutting machine 60 for use in the processing step 2 in the first embodiment includes a chuck table 61, a cutting unit 62, a moving unit (not depicted) for relatively moving the chuck table 61 and the cutting unit 62, and an imaging unit (not depicted). The cutting unit 62 includes a disc-shaped cutting blade 63, a spindle 64 that serves as a drive shaft for the cutting blade 63, and a mount flange that is attached to the spindle 64 and is used to fix the cutting blade 63. The cutting blade 63 and the spindle 64 have a common axis of rotation parallel to a holding surface of the chuck table 61, on which the workpiece 10 to be cut is held. The cutting blade 63 is fitted on a distal end of the spindle 64.

In the processing step 2 in the first embodiment, the workpiece 10 is first held on the side of the front surface 12 thereof under suction on the holding surface of the chuck table 61 via the thermocompression bonding sheet 30. An alignment is next performed between the cutting unit 62 and the workpiece 10. Described specifically, the moving unit (not depicted) moves the chuck table 61 to a processing region below the cutting unit 62, and the workpiece 10 is imaged by the imaging unit (not depicted), followed by an alignment, whereby desired one of the streets 13 of the workpiece 10 is brought into alignment with a processing feed direction of the cutting machine 60, and a processing point of the cutting blade 63 is also brought into alignment with above an extension of the desired street 13.

Next, the spindle 64 of the cutting unit 62 is driven to rotate the cutting blade 63, and at the same time, a supply of cutting water toward the back surface 15 of the workpiece 10 is initiated. The cutting unit 62 is then lowered to a predetermined height position by the moving unit (not depicted), and the chuck table 61 and the cutting blade 63 of the cutting unit 62 are relatively moved along the desired street 13. As a result, a grinding stone portion of the cutting blade 63, which is rotating about the horizontal axis of rotation, comes into contact with the workpiece 10 to cut the workpiece 10, so that cutting marks 18 are formed on the workpiece 10 and through the thermocompression bonding sheet 30 along the desired street 13.

When cutting is performed along all the streets 13, the workpiece 10 is singulated into the individual device chips 16. The device chips 16 are supported on the thermocompression bonding sheet 30 with an outer peripheral portion thereof compression bonded to the annular frame 20. The device chips 16 are individually picked up from the thermocompression bonding sheet 30, for example, by a pickup device or the like, and are incorporated and used in predetermined wiring boards or the like.

Second Embodiment

Figure 6:
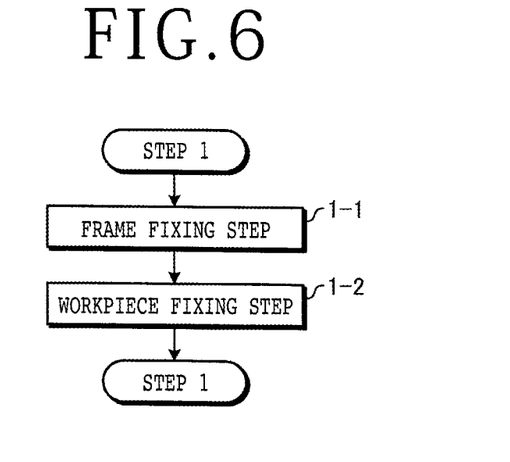
FIG. 6 is a flow chart diagram depicting a flow of an integration step in a processing method according to a second embodiment of the present invention for a workpiece.

A second embodiment of the present invention will be described based on FIGS. 6 through 9. FIG. 6 is a flow chart diagram depicting a flow of an integration step 1 in a processing method of the workpiece 10 according to the second embodiment. In the processing method of the second embodiment for the workpiece 10, the integration step 1 includes a frame fixing step 1-1 and a workpiece fixing step 1-2.

Figure 7:
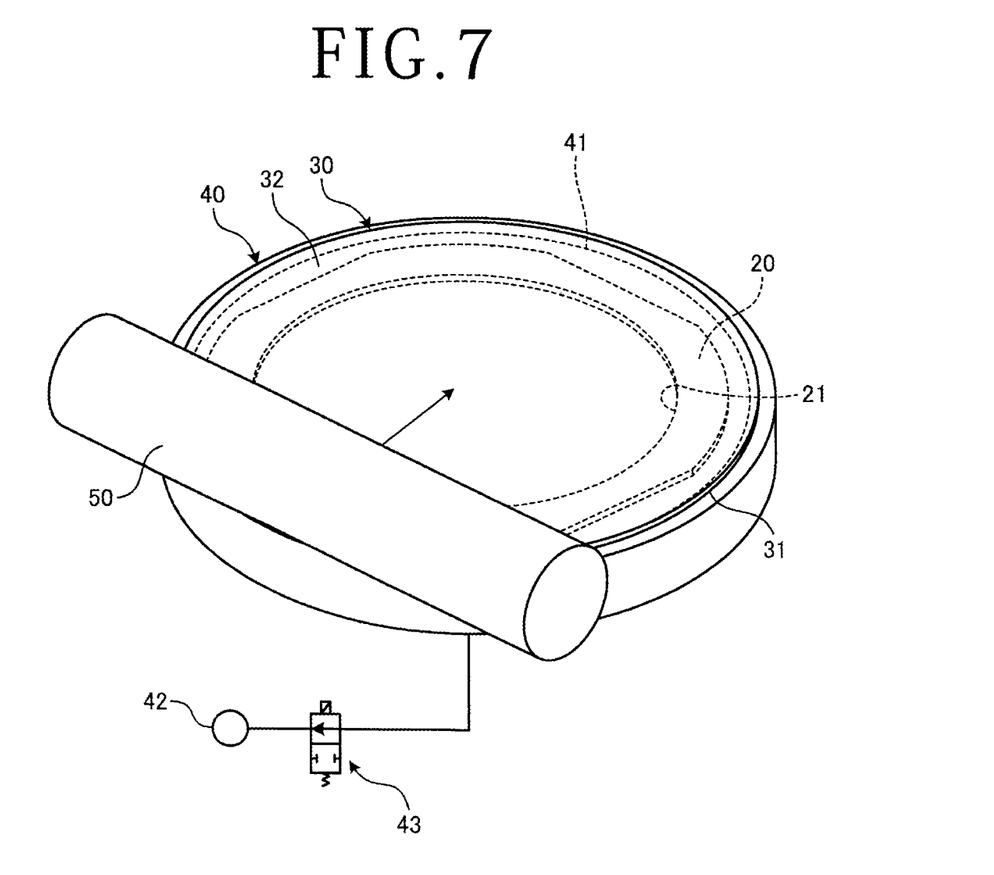
FIG. 7 is a perspective view schematically depicting an example of a frame fixing step depicted in FIG. 6.

FIG. 7 is a perspective view schematically depicting an example of the frame fixing step 1-1 depicted in FIG. 6. The frame fixing step 1-1 fixes the annular frame 20 to the thermocompression bonding sheet 30. In the frame fixing step 1-1 in the second embodiment, the annular frame 20 is fixed to the first surface 31 of the thermocompression bonding sheet 30.

First, in the frame fixing step 1-1 in the second embodiment, the heat source of the heat table 40 is activated to heat the holding surface 41 to a predetermined temperature, and at the same time, the heat source of the heat roller 50 depicted in FIG. 7 is activated to heat its surface to a predetermined temperature. Next, as depicted in FIG. 7, the annular frame 20 is positioned on the holding surface 41 of the heat table 40. As a consequence, the workpiece 10 is heated from the side of the back surface 15, and the annular frame 20 is heated from the side of the lower surface thereof, both, via the holding surface 41.

Next, the thermocompression bonding sheet 30 is placed onto the upper surface of the annular frame 20. Here, the first surface 31 of the thermocompression bonding sheet 30 is ensured to cover the entirety of the holding surface 41 so that, when the negative pressure is caused to act from the suction source 42, the negative pressure is prevented from leaking out through a gap. The switching valve 43 of the heat table 40 is then operated to bring the suction source 42 and the holding surface 41 into communication with each other, so that the negative pressure is caused to act on the annular frame 20 placed on the holding surface 41. As a consequence, the annular frame 20 is maintained on the side of the lower surface thereof in close contact with the holding surface 41 of the heat table 40.

As depicted in FIG. 7, the heat roller 50 the surface of which has been heated to the predetermined temperature is next placed on the one end of the holding surface 41 of the heat table 40. The heat roller 50 is then caused to roll on the second surface 32 of the thermocompression bonding sheet 30 from the one end to the other end of the holding surface 41 of the heat table 40 in a direction indicated by an arrow in FIG. 7. Here, the heat roller 50 presses the thermocompression bonding sheet 30 in such directions that the thermocompression bonding sheet 30 is pushed and spread out, thereby performing the thermocompression bonding of the thermocompression bonding sheet 30 to the annular frame 20.

As described above, in the frame fixing step 1-1 in the second embodiment, the thermocompression bonding sheet 30 is heated by the heat table 40 from the side of the lower surface of the annular frame 20, and is also heated by the heat roller 50 from the side of the second surface 32 of the thermocompression bonding sheet 30. In other words, the thermocompression bonding is performed by pressing the thermocompression bonding sheet 30 with the heat roller 50 while heating the thermocompression bonding sheet 30 from both of the surfaces thereof. As a consequence, the side of the first surface 31 of the thermocompression bonding sheet 30 and the side of the upper surface of the annular frame 20 are compression bonded. It is to be noted that the thermocompression bonding sheet 30 may preferably be heated to equal to or higher than its softening point and equal to or lower than its melting point when the thermocompression bonding sheet 30 is thermocompression bonded by the heat roller 50.

After the thermocompression bonding sheet 30 has been thermocompression bonded to the annular frame 20, a portion of the thermocompression bonding sheet 30, the portion being on an outer side of the outer periphery of the annular frame 20, is cut off and removed by a cutter or the like. The switching valve 43 is then operated to bring the suction source 42 and the holding surface 41 into a cut-off state, whereby the suction holding of the annular frame 20 on the holding surface 41 of the heat table 40 is released. It is to be noted that, in a production line which processes a plurality of workpieces 10 one after another, the thermocompression bonding of the thermocompression bonding sheets 30 to the annular frames 20 is performed one by one without deactivating the heat sources of the heat table 40 and heat roller 50.

Figure 8:
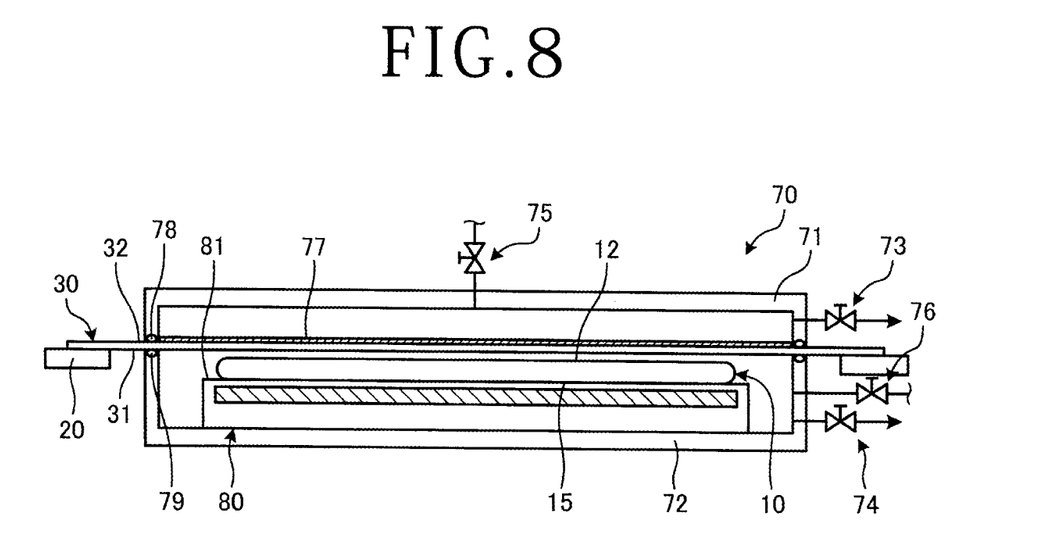
FIG. 8 is a cross-sectional view schematically depicting a first example of a workpiece fixing step depicted in FIG. 6.

FIG. 8 is a cross-sectional view schematically depicting a first example of the workpiece fixing step 1-2 depicted in FIG. 6. The workpiece fixing step 1-2 fixes the workpiece 10 to the thermocompression bonding sheet 30. In the workpiece fixing step 1-2 of the first example in the second embodiment, the workpiece 10 is fixed to the first surface 31 of the thermocompression bonding sheet 30. In other words, in the first example, the workpiece 10 is fixed to the same surface (the first surface 31) as the surface (the first surface 31), to which the annular frame 20 has been compression bonded, of the thermocompression bonding sheet 30 as in the first embodiment.

The workpiece fixing step 1-2 in the second embodiment is performed by a heat table 80 and a vacuum chamber 70. The vacuum chamber 70 includes an upper main body 71, a lower main body 72, pressure reduction units 73 and 74, atmosphere release units 75 and 76, a sheet fixing portion 77, and outer periphery fixing portions 78 and 79.

The upper main body 71 includes a downwardly open, hollow cover body. The lower main body 72 is disposed below the upper main body 71, and includes an upwardly open, hollow box body. The upper main body 71 and the lower main body 72 are formed with openings, which are of the same shape and are greater than the outer diameter of the workpiece 10 and smaller than an inner diameter of the annular frame 20. The upper main body 71 is movable up and down relative to the lower main body 72. When the upper main body 71 is lowered in such a manner that its opening overlaps with the opening of the lower main body 72, the upper main body 71 is integrated with the lower main body 72, thereby enabling to form a space, which is isolated from the exterior, inside the upper main body 71 and the lower main body 72.

Here, the thermocompression bonding sheet 30 can be fixed between the upper main body 71 and the lower main body 72. With the thermocompression bonding sheet 30 fixed between the upper main body 71 and the lower main body 72, the thermocompression bonding sheet 30 divides the internal space of the vacuum chamber 70 into two parts, one on a side of the upper main body 71, the other on a side of the lower main body 72.

Inside the lower main body 72, the heat table 80 is disposed. The heat table 80 may be similar to or different from the heat table 40 used in the frame fixing step 1-1. The heat table 80 is disposed such that, when the workpiece 10 is placed on a holding surface 81, the upper surface (front surface 12) of the workpiece 10 lies at a height slightly lower than the height of the opening of the lower main body 72 as depicted in FIG. 8 or substantially equal to the height of the opening of the lower main body 72.

The pressure reduction unit 73 includes a tubing, which is connected at one end thereof to a side wall or top wall (the side wall in the second embodiment) of the upper main body 71 and is connected at the other end thereof to a suction source (not depicted). By opening an on/off valve arranged in the tubing and communicating a negative pressure from the suction source, the pressure reduction unit 73 reduces the internal pressure of the upper main body 71. The pressure reduction unit 74 includes a tubing, which is connected at one end thereof to a side wall or bottom wall (the side wall in the second embodiment) of the lower main body 72 and is connected at the other end thereof to the suction source (not depicted). By opening an on/off valve arranged in the tubing and communicating the negative pressure from the suction source, the pressure reduction unit 74 reduces the internal pressure of the lower main body 72.

The atmosphere release unit 75 includes a tubing, which is connected at one end thereof to the side wall or top wall (the top wall in the second embodiment) of the upper main body 71 and is kept open to the atmosphere at the other end thereof. By opening an on/off valve arranged in the tubing, the atmosphere release unit 75 opens the interior of the upper main body 71 to the atmosphere. The atmosphere release unit 76 includes a tubing, which is connected at one end thereof to the side wall or bottom wall (the side wall in the second embodiment) of the lower main body 72 and is kept open to the atmosphere at the other end thereof. By opening an on/off valve arranged in the tubing, the atmosphere release unit 76 opens the interior of the lower main body 72 to the atmosphere.

The sheet fixing portion 77 is disposed on a side of the upper main body 71. When the upper main body 71 and the lower main body 72 together hold the thermocompression bonding sheet 30 therebetween, the sheet fixing portion 77 fixes the thermocompression bonding sheet 30 at a part thereof arranged inside the vacuum chamber 70. The sheet fixing portion 77 fixes the thermocompression bonding sheet 30 in such a manner that the internal space of the vacuum chamber 70 is divided into a space on the side of the upper main body 71, the space being surrounded by the upper main body 71 and the thermocompression bonding sheet 30, and a space on the side of the lower main body 72, the space being surrounded by the lower main body 72 and the thermocompression bonding sheet 30.

The outer periphery fixing portion 78 is disposed on an outer peripheral edge of the opening of the upper main body 71, and extends over an entire outer periphery of the opening of the upper main body 71. The outer periphery fixing portion 79 is disposed on an outer peripheral edge of the opening of the lower main body 72, and extends over an entire outer periphery of the opening of the lower main body 72. The outer periphery fixing portions 78 and 79 include sealing members made, for example, from an elastically deformable elastomer such as rubber. When the upper main body 71 and the lower main body 72 together hold the thermocompression bonding sheet 30 therebetween, the outer periphery fixing portions 78 and 79 fix the thermocompression bonding sheet 30.

In the workpiece fixing step 1-2 of the first example in the second embodiment, the heat source of the heat table 80 is first activated to heat the holding surface 81 to a predetermined temperature. The upper main body 71 of the vacuum chamber 70 is then raised to separate the upper main body 71 from the lower main body 72, and with the on/off valves of the pressure reduction unit 74 and atmosphere release unit 76 kept closed, the workpiece 10 is placed on the holding surface 81 of the heat table 80. Here, the workpiece 10 is placed on the side of the back surface 15 thereof on the holding surface 81 so that the front surface 12 of the workpiece 10 is directed upward. As a consequence, the workpiece 10 is heated from the side of the back surface 15 via the holding surface 81.

Next, with the on/off valves of the pressure reduction unit 73 and atmosphere release unit 75 kept closed, the thermocompression bonding sheet 30 compression bonded to the annular frame 20 is loaded so that the second surface 32 of the thermocompression bonding sheet 30 comes into contact with the sheet fixing portion 77 and the outer periphery fixing portion 78. The upper main body 71 is then lowered so that its opening overlaps with the opening of the lower main body 72, and the upper main body 71 is integrated with the lower main body 72 to seal the interiors of the upper main body 71 and the lower main body 72. Here, the first surface 31 of the thermocompression bonding sheet 30 comes into contact with the outer periphery fixing portion 79. Further, the thermocompression bonding sheet 30 divides the internal space of the vacuum chamber 70 into the space on the side of the upper main body 71, the space being surrounded by the upper main body 71 and the thermocompression bonding sheet 30, and the space on the side of the lower main body 72, the space being surrounded by the lower main body 72 and the thermocompression bonding sheet 30.

With the on/off valve of the atmosphere release unit 75 kept closed, the on/off valves of the pressure reduction units 73 and 74 are then opened to reduce the pressure of the internal space of the vacuum chamber 70 through the pressure reduction units 73 and 74. Described more specifically, the space on the side of the upper main body 71, the space being surrounded by the upper main body 71 and the second surface 32 of the thermocompression bonding sheet 30, is reduced in pressure by the pressure reduction unit 73, and the space on the side of the lower main body 72, the space being surrounded by the lower main body 72 and the first surface 31 of the thermocompression bonding sheet 30, is reduced in pressure by the pressure reduction unit 74. After both of the spaces have been reduced in pressure for a predetermined time, the on/off valves of the pressure reduction units 73 and 74 are closed again.

After that, with the on/off valves of the pressure reduction units 73 and 74 and atmosphere release unit 76 kept closed, the on/off valve of the atmosphere release unit 75 is opened. Through the tubing of the atmosphere release unit 75, air then flows into the space on the side of the upper main body 71, the space being surrounded by the upper main body 71 and the second surface 32 of the thermocompression bonding sheet 30, so that the internal pressure of the space rises closer to the atmospheric pressure. As a consequence, the flowing-in air presses the thermocompression bonding sheet 30 toward the front surface 12 of the workpiece 10.

When comes into contact with the front surface 12 of the workpiece 10, the thermocompression bonding sheet 30 is heated via the workpiece 10 as the workpiece 10 has been being heated by the heat table 80, so that the thermocompression bonding sheet 30 is brought into close contact with the front surface 12 of the workpiece 10. As a consequence, the side of the first surface 31 of the thermocompression bonding sheet 30 with the annular frame 20 compression bonded to the outer periphery thereof and the side of the front surface 12 of the workpiece 10 are compression bonded, whereby the workpiece 10 and the annular frame 20 are integrated via the thermocompression bonding sheet 30.

It is to be noted that the thermocompression bonding sheet 30 may preferably be heated to equal to or higher than its softening point and equal to or lower than its melting point when heated by the heat table 80 via the workpiece 10. After the thermocompression bonding sheet 30 has been thermocompression bonded to the workpiece 10, the on/off valve of the atmosphere release unit 76 is opened to bring the space on the side of the lower main body 72, the space being surrounded by the lower main body 72 and the first surface 31 of the thermocompression bonding sheet 30, into communication with the atmosphere, so that the upper main body 71 is raised. The thermocompression bonding sheet 30 is cooled in a production line as the workpiece 10 and the annular frame 20 are sequentially unloaded from the heat table 80.

Figure 9:
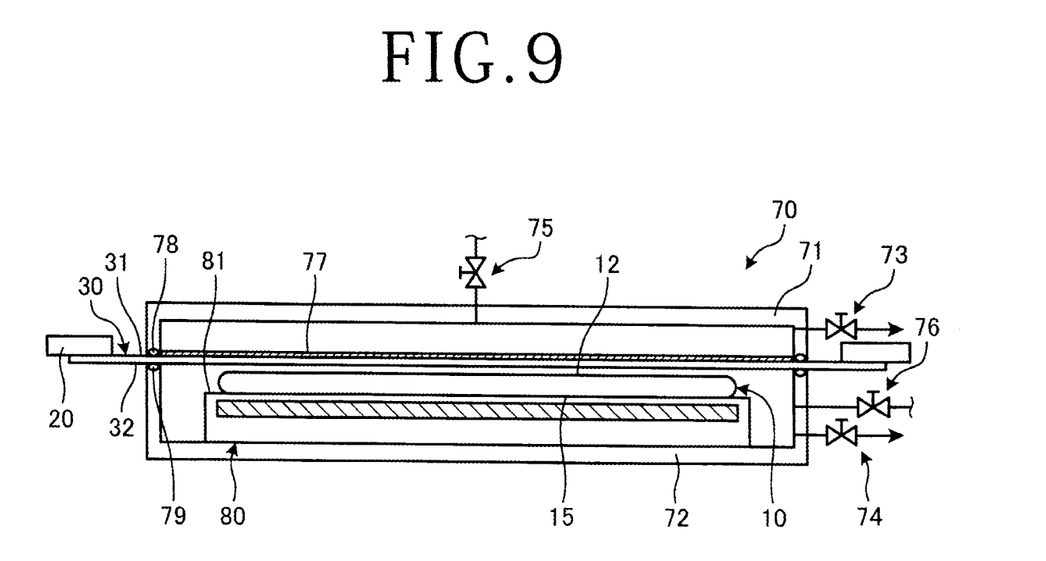
FIG. 9 is a cross-sectional view schematically depicting a second example of the workpiece fixing step depicted in FIG. 6.

FIG. 9 is a cross-sectional view schematically depicting a second example of the workpiece fixing step 1-2 depicted in FIG. 6. In the workpiece fixing step 1-2 of the second example in the second embodiment, the workpiece 10 is fixed to the second surface 32 of the thermocompression bonding sheet 30. In other words, in the second example, the workpiece 10 is fixed to the surface (the second surface 32) on a side opposite to the surface (the first surface 31), to which the annular frame 20 has been compression bonded, of the thermocompression bonding sheet 30.

A description of the workpiece fixing step 1-2 of the second example is omitted because, in comparison with the workpiece fixing step 1-2 of the first example depicted in FIG. 8, its procedure is similar except that it is performed by reversing the first surface 31 and the second surface 32 of the thermocompression bonding sheet 30.

As described above, the processing methods according to the first and second embodiments for the workpiece 10 each presses the thermocompression bonding sheet 30, which has no bonding layer, while directing heating both the thermocompression bonding sheet 30 and the annular frame 20, to which the thermocompression bonding sheet 30 is to be fixed, using both the heat table 40 and the heat roller 50 when thermocompression bonding the thermocompression bonding sheet 30 to the annular frame 20. The thermocompression bonding sheet 30, despite the absence of any bonding layer, can be firmly compression bonded to the annular frame 20 to which a resin is hardly compression bonded compared with the workpiece 10 (semiconductor wafer) as the annular frame 20 contains more irregularities and scratches on the surfaces thereof and in many instances, is made of metal.

The present invention should not be limited to the above-described embodiments. In other words, the present invention can be practiced with various modifications within the scope not departing from the spirit of the present invention.

Described specifically, for example, the thermocompression bonding of the thermocompression bonding sheet 30 to the workpiece 10 and the annular frame 20 may be performed at the same time as in the first embodiment, or may be performed separately as in the second embodiment. Further, the workpiece 10 and the annular frame 20 may be compression bonded to the same surface of the thermocompression bonding sheet 30 as in the first embodiment and the first example of the second embodiment, or may be compression bonded to the different surfaces of the thermocompression bonding sheet 30 as in the second example of the second embodiment. When the workpiece 10 and the annular frame 20 are compression bonded to the different surfaces of the thermocompression bonding sheet 30, the thermocompression bonding sheet 30 may also be compression bonded to the workpiece 10 by the heat roller 50 in the workpiece fixing step 1-2.

In each embodiment, the thermocompression bonding sheet 30 is compression bonded to the front surface 12, which has the devices 14, of the workpiece 10. In the present invention, however, the thermocompression bonding sheet 30 may also be compression bonded to the back surface 15 of the workpiece 10. If the thermocompression bonding sheet 30 is compression bonded to the front surface 12, the processing step 2 may perform, for example, grinding processing to grind the back surface 15 of the workpiece 10, or laser processing such as stealth dicing from the back surface 15. If the thermocompression bonding sheet 30 is compression bonded to the back surface 15, the processing step 2 may perform, for example, cutting processing as in the first embodiment, or laser processing such as dicing, from the front surface 12 of the workpiece 10.

If some irregularities still remain on the second surface 32 of the thermocompression bonding sheet 30 after the thermocompression bonding sheet 30 has been fixed by thermocompression bonding to the side of the front surface 12, which has the devices 14, of the workpiece 10 and the annular frame 20, a layer may be formed on the second surface 32 of the thermocompression bonding sheet 30 with UV-curable liquid resin to absorb the irregularities formed by the devices 14, for example, with UV-curable liquid resin to absorb such remaining irregularities.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A processing method of a workpiece, comprising:
a positioning step of positioning an annular frame that has an opening to receive the workpiece therein on a heat table with a first heat source included therein;
a thermocompression sheet placing step of placing a thermocompression bonding sheet on the annular frame;
an integration step of heating and compression bonding the thermocompression bonding sheet to the annular frame and to the workpiece received in the opening, thereby the annular frame and the workpiece are integrated via the thermocompression bonding sheet; and
a processing step of processing the workpiece integrated with the annular frame via the thermocompression bonding sheet,
wherein, in the integration step, the thermocompression bonding sheet is pressed against the annular frame that has been heated by the heat table, by a heat roller with a second heat source included therein while being heated by the heat roller, thereby the thermocompression bonding sheet is fixed to the annular frame while the thermocompression bonding sheet is being heated from both an upper surface thereof and from a lower surface thereof.

2. The processing method according to claim 1, wherein, in the integration step, the workpiece and the annular frame are both fixed to one surface of the thermocompression bonding sheet.

3. The processing method according to claim 1, wherein, in the integration step, the workpiece and the annular frame are fixed to one surface and another surface, respectively, of the thermocompression bonding sheet, wherein the one surface and the another surface are on opposite sides of the thermocompression bonding sheet.

4. The processing method according to claim 3, wherein the integration step includes:
- a workpiece fixing step of fixing the workpiece to the one surface of the thermocompression bonding sheet, and
- a frame fixing step of fixing the annular frame to the another surface of the thermocompression bonding sheet.

5. The processing method according to claim 1, wherein the thermocompression bonding sheet has no bonding layer in regions where the workpiece and the annular frame are compression bonded.

6. The processing method according to claim 1, wherein during the integration step, the workpiece and the annular frame are both fixed to the thermocompression bonding sheet while the heat roller is pressed against the thermocompression bonding sheet.

7. The processing method according to claim 1, wherein the integration step comprises:
- a frame fixing step in which the frame is integrated with the thermocompression bonding sheet via the heat roller; and
- a workpiece fixing step in which the workpiece is integrated with the thermocompression bonding sheet,
- wherein the frame fixing step is performed before the workpiece fixing step.

8. The processing method according to claim 7, wherein the workpiece fixing step comprises:
- placing the workpiece on a holding surface within a vacuum chamber;
- positioning the thermocompression bonding sheet, with the annular frame affixed thereto, within the vacuum chamber;
- dividing an internal space of the vacuum chamber into an upper space and a lower space with the thermocompression bonding sheet; and
- creating a pressure differential between the upper space and the lower space such that the thermocompression bonding sheet is pressed toward the workpiece.

9. A processing method of a workpiece, comprising:
- an integration step of heating and compression bonding a thermocompression bonding sheet to an annular frame that has an opening to receive the workpiece therein and to the workpiece received in the opening, thereby the annular frame and the workpiece are integrated via the thermocompression bonding sheet; and
- a processing step of processing the workpiece integrated with the annular frame via the thermocompression bonding sheet,
- wherein the integration step comprises:
  - a frame fixing step in which the thermocompression bonding sheet is pressed against the annular frame that has been heated by a heat table with a heat source included therein, by a heat roller with a heat source included therein while being heated by the heat roller, thereby fixing thermocompression bonding sheet is fixed to the annular frame; and
  - a workpiece fixing step of fixing the workpiece to the thermocompression bonding sheet with the frame affixed thereon,
- wherein the workpiece fixing step is performed after the frame fixing step.

* * * * *